United States Patent [19]
Parr

[11] 3,856,683
[45] Dec. 24, 1974

[54] DUAL FLOW FLUID FILTER
[76] Inventor: Erwin W. Parr, 3001 McKinley, Des Moines, Iowa 50321
[22] Filed: Dec. 15, 1972
[21] Appl. No.: 315,495

[52] U.S. Cl.................... 210/336, 210/445, 210/489
[51] Int. Cl............................................. B01d 29/14
[58] Field of Search ........... 210/336, 445, 447, 448, 210/446, 451, 489, 323, 444

[56] References Cited
UNITED STATES PATENTS
| | | | |
|---|---|---|---|
| 2,202,403 | 5/1940 | Sandberg | 210/445 |
| 2,883,056 | 4/1959 | Muller | 210/336 |
| 3,719,595 | 3/1973 | Johnson | 210/445 |

FOREIGN PATENTS OR APPLICATIONS
| | | | |
|---|---|---|---|
| 18,609 | 7/1934 | Australia | 210/338 |
| 372,606 | 3/1923 | Germany | 210/131 |

*Primary Examiner*—Samih N. Zaharna
*Assistant Examiner*—Robert G. Mukai
*Attorney, Agent, or Firm*—Henderson & Strom

[57] ABSTRACT

A Dual Flow Fluid Filter is provided which comprises a casing open at opposite end and having disposed within the casing a pair of identical filters arranged back-to-back and with a peripheral dam disposed between which forces the flow of fluid being filtered from outside a first filter to inside that filter, then to the inside of the next or second filter and to the outside thereof prior to leaving the casing, whereby a dual filtration of the fluid is obtained.

2 Claims, 4 Drawing Figures

PATENTED DEC 24 1974 3,856,683

DUAL FLOW FLUID FILTER

BACKGROUND OF THE INVENTION

Present day filters comprise a permanent housing and normally a replaceable filter within the housing which filters the fluid but one time, usually wherein the fluid flows into the casing and then from outside the filter to the inside thereof prior to leaving the casing from the inside of the filter. To applicant's knowledge, none of the present day filtration units provide a dual or double filtering by using a pair of identical filters appropriately arranged within the same casing. To the provision of such a dual filtration, this invention is directed.

SUMMARY OF THE INVENTION

This invention provides a dual filtration within a single casing by a pair of identical filters arranged back-to-back, wherein each filter has an annular flange provided at the open end thereof, such that when the open ends are joined intermediate the casing, a dam is provided between the periphery of the filters and the internal surface of the casing, such that upon flow of fluid through the casing, the fluid passes from outside one filter to the inside thereof and then from the inside of the next adjacent filter to the outside thereof prior to leaving the casing.

It is an object of this invention to provide and improved fluid filter.

It is another object of this invention to provide a dual filtration arrangement including a pair of identical filters which are disposed relative to each other within a single casing to provide a dual or reverse flow of filter through the pair of filter units.

It is another object of this invention to provide a fluid filter wherein the filter cartridges are so designed with an annular flange at an open end thereof opposite a closed end, such that upon the open ends being placed together, dual or double filtration of the fluid flowing through the casing is provided.

Still another object of this invention is to provide a dual fluid filter of large capacity having a high filtration efficiency which is economical, simple, and of a disposable nature after use.

These and other objects of this invention will be readily ascertainable upon reference to the following description when taken in conjunction with the accompanying drawings.

DESCRIPTION OF THE PREFERRED EMBODIMENT

Figure 1:
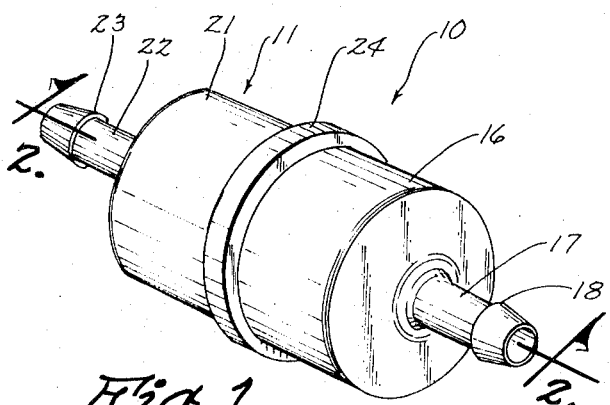
FIG. 1 is a perspective view of the dual fluid filter of this invention.
Figure 3:
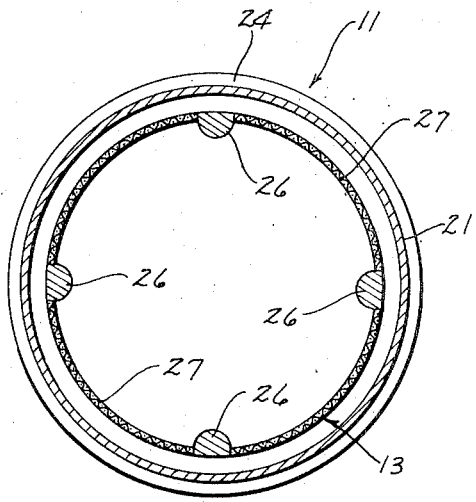
FIG. 3 is a vertical sectional view taken along the line 3—3 in FIG. 2.
Figure 2:
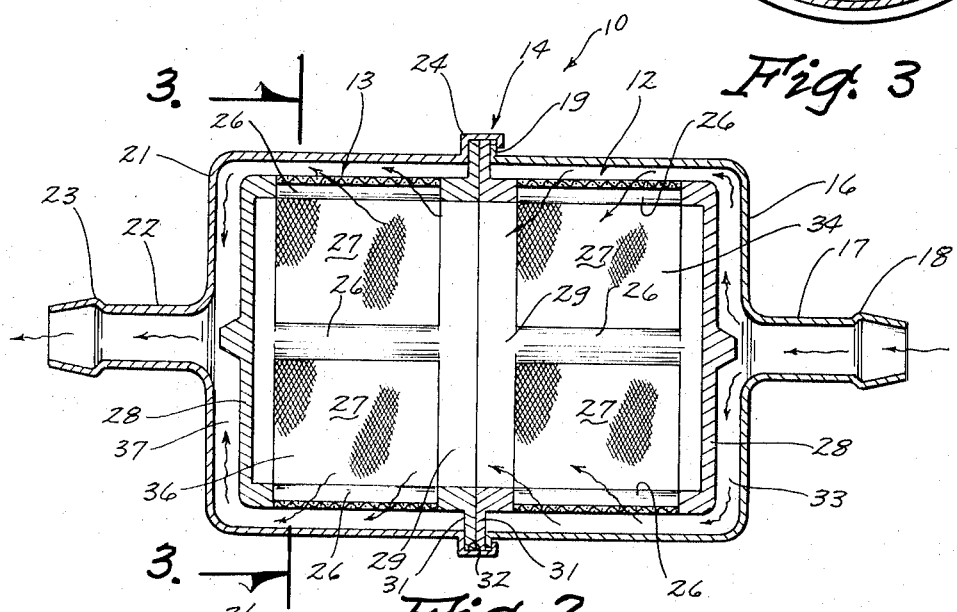
FIG. 2 is an enlarged longitudinal sectional view of the filter of FIG. 1.
Figure 4:
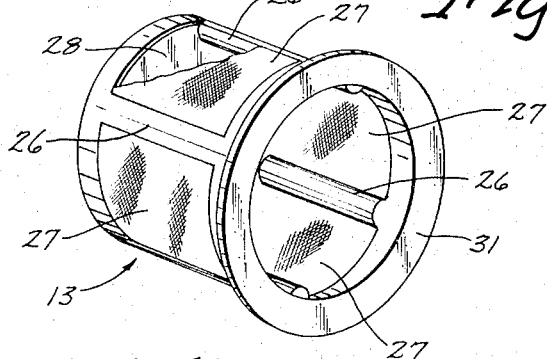
FIG. 4 is a perspective view of a filter cartridge shown disposed within the structure of FIG. 2.

Referring particularly to FIG. 1, a preferred embodiment of the dual flow fluid filter of this invention is indicated generally at 10 therein and comprises generally a casing or housing 11, a first filter unit 12 (FIG. 2) disposed within the casing 11, a second filter unit 13 also disposed within the casing 11, and a wall or dam unit 14 (FIG. 2) the purpose of which is described in detail hereinafter. It will be noted that the dam unit is disposed intermediate the ends of the casing 11.

In more detail, the casing 11 comprises an inlet cylindrical shell 16 open at one end and closed at the other with the closed end having an inlet nipple 17 provided centrally thereof and which has an annular bead 18 insertable into a fluid connection (not shown). At the open end of the shell 21 an out-turned lip 19 is provided.

The casing also comprises an outlet cylindrical shell 21 having the same general dimensions as the inlet shell 16, which also has an open end and a closed end with the closed end having an outlet nipple 22 with an annular bead 23 also adapted for insertion into a fluid connection (not shown). A generally U-shaped flange 24 is provided at the open end of the outlet shell 21 for encasing the lip 19 of the inlet shell 16 so as to provide, when the two shells 16 and 21 are joined, a fluid-tight casing with the ends 17 and 22 open for the inflow and outflow of a fluid, respectively.

As both the first filter unit 12 and the second filter unit 13 are identical in construction, only one will be described with reference numerals being used to indicate identical parts. Each unit 12 and 13 comprises a cylindrical arrangement including a plurality of arcuately spaced ribs 26 between which perforate screens 27 are disposed, and at one end of which an imperforate wall 28 is secured, with the other end 29 being open. At the open end of each filter unit an outwardly extended, annular flange 31 is provided. It will be noted that the ribs 26 and the screens 27 are formed to provide a cylindrical structure which is concentrically arranged within a respective shell 16 and 21 of the casing 11, and whereby the outer diameter of the filter unit 12 and 13 is less than the inner diameter of the casing shell 16 and 21 such that fluid may normally flow outside of each filter unit and within the casing 11.

The dam unit 14, however, prevents flow of fluid along the interior of the casing 11 intermediate the closed ends thereof in that the flanges 31 have a sufficient outer diameter to engage the inner surface 32 of the flange 24 whereby a fluid-tight seal or dam at that portion of the casing is provided.

It will be noted that the filter units 12 and 13 are placed longitudinally within the casing 11 in a back-to-back arrangement wherein both flanges 31 engage each other and also engage the inner surface 32 of the outlet shell flange 24. By this arrangement, upon fluid entering the inlet nipple 17, it flows through an entry flow chamber 33 as indicated by the arrows in FIG. 2 about the imperforate wall 28 of the first filter unit 12, and then passes through the screens 27 of the first filter unit 12 into the interior chamber 34 thereof. As the fluid cannot flow exterior of the screens 27 of the first filter unit 12 past the dam unit 14, the fluid in the interior chamber 34 must also pass into the interior chamber 36 (FIG. 2) of the second filter unit 13.

At that point, due to the imperforate wall 28 of the second filter unit 13, the fluid must flow outwardly or in a reversed direction relative to the inward flow through the first filter unit 12, through the perforate screens 27 of the second filter unit 13 and from there into the exit flow chamber 37 (FIG. 2) at the outlet end of the casing. The fluid then flows through the outlet nipple 22, having received a dual filtration by virtue of the structure hereinbefore described.

In summary, it is readily seen that by having a pair of identical filters arranged in a back-to-back relationship, and due to the provision of the annular flanges at their open ends forming a dam with the casing, a dual or reverse filtration of the fluid flowing through the casing 11 is provided by this simple and efficient structure.

I claim:

1. A dual filter comprising:

a cylindral casing having a first portion with an inlet therein and a second portion with an outlet therein, said inlet and outlet being coaxially aligned;

first cylindrical filter means disposed in said first portion of the casing, said first filter means having a first perforate peripheral surface spaced from the interior of the casing, a first imperforate annular flange extended radially outwardly from one end of the first filter means and abutting a peripheral edge of said first portion of the casing;

second cylindrical filter means disposed in said second portion of the casing, said second filter means having a second perforate peripheral surface spaced from the interior of the casing, a second imperforate annular flange extending radially outwardly from one end of the second filter means and abutting the first annular flange of the first filter means and abutting a peripheral edge of said second portion of the casing;

clamping means on said casing for clamping the abutting first and second annular flanges between the peripheral edges of said first and second portions of the casing and thereby forming a seal thereat; and supporting means for supporting said perforate surfaces of the first and second filter means, said supporting means comprising a plurality of parallel ribs extending from the first and second annular flanges, along the first and second perforate surfaces, to the other respective ends of said first and second filter means, said other ends of said first and second filter means being imperforate, and each other end having a tapering projection thereon which is coaxially aligned with the coaxially aligned inlet and outlet to thereby disperse the flow of fluid evenly through the filter.

2. A dual filter as defined in claim 1 wherein said first filter means and said second filter means are identical.

* * * * *